US009253623B2

(12) United States Patent
Wu et al.

(10) Patent No.: US 9,253,623 B2
(45) Date of Patent: Feb. 2, 2016

(54) METHOD, SYSTEM, MAPPING FORWARD SERVER AND ACCESS ROUTER FOR MOBILE COMMUNICATION CONTROLLING

(75) Inventors: Qiang Wu, Shenzhen (CN); Hua Jiang, Shenzhen (CN); Tao Fu, Shenzhen (CN); Bing Huang, Shenzhen (CN)

(73) Assignee: ZTE Corporation (CN)

( * ) Notice: Subject to any disclaimer, the term of this patent is extended or adjusted under 35 U.S.C. 154(b) by 522 days.

(21) Appl. No.: 13/635,139

(22) PCT Filed: Oct. 22, 2010

(86) PCT No.: PCT/CN2010/078015
§ 371 (c)(1),
(2), (4) Date: Sep. 14, 2012

(87) PCT Pub. No.: WO2011/153777
PCT Pub. Date: Dec. 15, 2011

(65) Prior Publication Data
US 2013/0016664 A1  Jan. 17, 2013

(30) Foreign Application Priority Data
Jun. 10, 2010  (CN) .......................... 2010 1 0206457

(51) Int. Cl.
*H04W 8/08* (2009.01)
*H04L 29/12* (2006.01)
(Continued)

(52) U.S. Cl.
CPC ............. *H04W 8/082* (2013.01); *H04L 61/103* (2013.01); *H04L 45/74* (2013.01); *H04L 2212/00* (2013.01); *H04W 40/20* (2013.01); *H04W 80/04* (2013.01); *H04W 88/182* (2013.01)

(58) Field of Classification Search
None
See application file for complete search history.

(56) References Cited

U.S. PATENT DOCUMENTS

| 6,175,867 B1 | 1/2001 | Taghadoss |
| 2004/0114558 A1 | 6/2004 | Krishnamurthi et al. |

(Continued)

FOREIGN PATENT DOCUMENTS

| CN | 101123536 A | 2/2008 |
| CN | 101667916 A | 3/2010 |

(Continued)

OTHER PUBLICATIONS

Gonzales, O. et al., "Study and Evaluation of Mobility Management for the IP-Based IMT Platform (IP2) Architecture", Vehicular Technology Conference, 2003, IEEE 58th, vol. 3, pp. 1954, 1958; Oct. 6-9, 2003.

(Continued)

*Primary Examiner* — Kevin C Harper
*Assistant Examiner* — Peter Chen
(74) *Attorney, Agent, or Firm* — Marger Johnson

(57) ABSTRACT

A method, system, mapping forwarding server and access router for mobile communication control are provided in the present invention. The method includes a flow of sending a data message from a source mobile terminal to a destination mobile terminal, including the following steps: A, a source access router receiving a first data message sent by the source mobile terminal, and executing step B; B, encapsulating a location identifier according to an identity identifier in the first data message, and acquiring a second data message; forwarding the second data message to a destination access router connected to the destination mobile terminal according to the location identifier in the second data message; and C, the destination access router stripping out the location identifier encapsulation in the second data message to return the second data message to the first data message, and forwarding the first data message to the destination mobile terminal.

20 Claims, 6 Drawing Sheets

(51) Int. Cl.
  *H04L 12/741* (2013.01)
  *H04W 80/04* (2009.01)
  *H04W 40/20* (2009.01)
  *H04W 88/18* (2009.01)

(56) References Cited

U.S. PATENT DOCUMENTS

| | | |
|---|---|---|
| 2006/0018291 A1 | 1/2006 | Patel et al. |
| 2008/0130571 A1* | 6/2008 | Maeda et al. ................. 370/331 |
| 2008/0192677 A1* | 8/2008 | Abusch-Magder et al. .. 370/328 |
| 2010/0014517 A1* | 1/2010 | Huang et al. ................. 370/389 |

FOREIGN PATENT DOCUMENTS

| | | |
|---|---|---|
| EP | 1826958 A1 | 8/2007 |
| EP | 1978680 A1 | 10/2008 |
| JP | 2006-19775 | 1/2006 |
| JP | 2006-74379 | 3/2006 |
| JP | 2007-159157 | 6/2007 |
| JP | 2010-500781 | 1/2010 |
| JP | 2010-500782 | 1/2010 |

OTHER PUBLICATIONS

Jiang, J. et al., "A Novel Mix-Based Location Privacy Mechanism in Mobile IPv6", Computers and Security 24(8), pp. 629-641, 2005.

International Search Report, Patent Cooperation Treaty, Dec. 15, 2011, 5 pages, PCT/CN2010/078015, The State Intellectual Property Office, the P.R. China, Beijing, China.

* cited by examiner

METHOD, SYSTEM, MAPPING FORWARD SERVER AND ACCESS ROUTER FOR MOBILE COMMUNICATION CONTROLLING

TECHNICAL FIELD

The present invention relates to the field of communication, and in particular, to a method, system, mapping forwarding server and access router for mobile communication control.

BACKGROUND ART

FIG. 1 shows a basic mobile internet protocol (IP) system. Mobile IP version 6 (referred to as MIPv6 hereinafter) is a method for processing IP node mobility that is defined by the Internet Engineering Task Force (IETF) ["RFC3775: Mobility Support in IPv6", June, 2004, IETF]. All mobile nodes (MN) 11 using the mobile IP (MIP) protocol have corresponding home agents (HA) 12 and home IP addresses (HoA), wherein, the route of the HoA address in the network topology points to the HA.

IP sub-network which the MN accesses becomes a "visited network (VN)". The HA corresponding to the MN is located outside any VN that may be accessed. When a MN is located within a certain VN, the MN cannot use its HoA as a valid IP address, because the route of the HoA in the network topology does not point to the VN. Therefore, the MN configures a care-of address (CoA) using a valid local prefix. As long as the MN resides within the same visited IP network, the CoA can be used to transmit and receive an IP message. Change of the VN will cause IP switching. "Correspondent node (CN)" refers to an IP host that is communicating with the above MN. One MN can communicate with a plurality of CNs simultaneously, and the MN per se is movable.

The MN using MIP can select among two communication modes, so as to keep the session continuity in the case of IP mobility. In the first case, all services between the CN and MN are forwarded by the HA using a bidirectional channel. Every time the CoA of the MN changes, the MN updates the HoA-CoA mapping relationship in the HA using a binding update (BU) message. The HA forwards all received IP messages with the HoA being the destination address to the MN using the actual CoA channel of the MN. Similarly, the MN uses the HoA as the internal source IP address, and sends all sent-out messages to the HA through the channel. The HA de-encapsulates the data message and sends the packet to its final destination IP address. If the HA is trusted by the MN, this communication mode can realize location privacy. However, a disadvantage of this communication mode is suboptimality of the routing: all data messages need to pass through the home agent HA, and thus there is routing alternate (or called as triangle routing).

The second communication mode in the MIP is routing optimization. Routing optimization allows the data message to be directly transmitted and received between the MN and the CN without visit to the HA. Routing optimization is implemented by sending a BU message from the MN to the CN. The BU message contains the CoA address of the MN. Afterwards, the data message between the MN and the CN adopts the CoA address as a source address or a destination address, and such data message is sent using an optimal routing. Since the location of the MN (CoA, for indicating the current location of the MN in the network topology) is disclosed to the CN, this process violates location privacy.

The above-mentioned MIP system of the IETF standard does not allow combination of location privacy and routing optimization.

Meanwhile, the mobile control system using "reverse channel" mobile IP protocol has a problem, namely: the source mobile terminal (MT) #1 has to reconfigure the care-of address of the mobile node MN and the care-of address of the destination mobile terminal MT#2 in the data message header, so the data message header is very big.

In order to solve the above problem, the patent application titled "A method and apparatus for route grouping in mobile IP system" filed on Aug. 9, 2006, with a publication No. 101507226 and a filing No. of 200680055577.6 proposes a solution.

As shown in FIG. 2, by adding functional nodes such as NCPF (RM) 21 and $IP^2P$, the $IP^2$ system structure and MIP/layered MIP (HMIP) system are combined in this solution to provide a method, device and system for optimally solving this problem. In the invention, IPha is a unique permanent host identifier assigned to the MN, and IPra is a routing host address. The routing optimization flow initiated by MN is monitored through a monitoring unit provided inside the $IP^2P$. When the MN initiates the routing optimization, the $IP^2P$ detects and intercepts the BU message, and sends an activation notification to the NCPF (RM), the NCPF (RM) sends a routing optimization instruction to the related $IP^2P$ after receiving the activation notification, and the related $IP^2P$ optimizes the forwarding routing of the data message based on the received routing optimization instruction. As a result, the data message is implemented on MN→$IP^2P\_MN$→$IP^2P\_CN$→CN. Therefore, the routing path via the $IP^2P$ is shorter than the forwarding path via the home agent HA. The method for forwarding a data message between $IP^2P$ may be address exchange, tunnel delivery or secure tunnel delivery. In addition, the routing addresses (CoA, LCoA, etc.) of the MN are applied safely, so the location privacy of the MN is preferably protected. The main problems of this solution are as follows:

1-1 All data messages sent out by the MN need to be traversed in order to monitor the routing optimization flow initiated by the MN, which will cost a large amount of processing performance of the $IP^2P$.

1-2 the communication terminal on which the invention is based must be a MIP terminal, or a communication terminal with a particular functional requirement based on a similar technique principle, and the implementation process needs participation of the terminal.

1-3 The routing optimization of MIP is an end-to-end process, which requires the end to end to support the MIP routing optimization protocol, and there is still routing alternate when the MIP terminal does not perform routing optimization or does not possess the routing optimization condition (for example, the correspondent node is a fixed access terminal that does not support the MIP protocol, or the version of the MIP protocol supported by the correspondent node is different).

A patent application for invention titled "Mobile communication control system and method, routing device, server and data structure" with a filing No. of 03157408.4 and publication No. of 1496154 was filed on Sep. 19, 2003.

In the patent solution, in considering the problems existing in the mobile IP technology including route redundancy and leak of the current location information of the mobile node (mobile terminal) and the IP address of the local proxy server, the following steps are defined: converting a first address of a destination mobile terminal 2 included in a packet as a destination address, to a second address of the destination mobile terminal 2 which is associated with the first address of the destination mobile terminal 2, in a source router (AR2); and converting the second address of the destination mobile terminal 2 included in the received packet as a destination address, to the first address of the destination mobile terminal 2 which is associated with the second address of the destination mobile terminal 2, in a router AR3.

This technical scheme has the following defects:

2-1 This scheme provides a method for converting between the first address and the second address, and the judging bits in the IPv6 address are redefined to distinguish the first address from the second address. The accepted meaning of the 128-bit address of the IPv6 has been explicitly defined in the IETF standard organization, wherein the judging bits are defined, which on one hand decreases the number of available IPv6 addresses, but on the other hand arises the possibility of being conflicting to the existing protocol specifications, so the IPv6 address definition in the existing regulation standards needs to be modified.

2-2 The network management server NCPF maintains a line selecting table managing unit, and sends a notification message to a related router through a router device control unit to optimize the routing transmission path. During the process of routing optimization and routing information maintenance, update and deletion, the network management server NCPF will interact with the related router, but how the network management server NCPF obtains the related router is not specifically introduced. The network management server NCPF can only obtain the related router information by interacting with the terminal or the router AR which the terminal accesses, which demands a complicated signaling interaction process.

2-3 The process of optimizing the routing transmission path is triggered by one of the access routers of the two communication terminals or one of the communication terminals. The network management server NCPF sends out a notification message for optimizing the routing transmission path, and then the access router of the two communication terminals executes the operation of optimizing the routing according to the notification message. Wherein participation of the network server NCPF in this process is not necessary, and participation of the network server NCPF causes unnecessary fault nodes, and makes this process more complicated.

2-4 Each terminal will have both the IP host address and IP routing address, and thus occupies two IP addresses, which causes certain resource waste.

2-5 When the IP host address is not stored in the buffer table of the transmission storage unit, the address judging unit stores the IP packet in a buffer temporarily. At this moment, the address judging unit queries the location information management server to obtain the IP routing address (the second address) corresponding to the IP host address as the destination address. According to the query result, the destination address in the IP packet is converted from the IP host address into the IP routing address, and is buffered in the buffer, and the IP packet is sent to the routing unit.

The number of IP packets stored in the buffer is closely related with the time of query and the rate of sending the messages by the mobile terminal. Since these stored IP packets need to occupy the performance of the storage unit and also need complicated processing such as queue management, big processing load and complexity will be brought to the device with the background of increasing wireless bandwidth and wired access bandwidth. Meanwhile the storing and forwarding mode causes increase of the forwarding delay of the data message.

The patent application for invention titled "Mobile communication control system, network management server and node" field on Feb. 4, 2004, with a filing No. of 200410003107.8 and publication No. of 1523837 is a specific scene of the above patent application for invention of "Mobile communication control system and method, routing device, server and data structure", its basic principle is the same as the above patent application solution, and it has the features 2-2, 2-3 and 2-4 of the above patent application.

The patent application titled "Method and apparatus for route grouping in mobile IP system" filed on Aug. 9, 2006 with a publication No. of 101513006 and a filing No. of 200680055560.0 proposes a method for solving the problem in the switching scene in the $IP^2$ solution. It has the following features:

3-1 The basic method for converting the address of the data message is using IPra to replace IPha.

3-2 The routing optimization process is implemented as follows: after nAR113 initiates an activation notification AN to the RM121 through step S202, RM121 sends the IP update in step S204 to the opposite end AR111. RM121 is the main body for initiating the routing optimization process.

3-3 How RM121 obtains the information of the opposite end AR111 and to which AR111 the routing optimization process is initiated are not explicitly described in the patent solution.

It has the defects 2-2, 2-3 and 2-4 of the above patent application solution.

SUMMARY OF THE INVENTION

The technical problem to be solved in the present invention is to provide a method, system for mobile communication control, mapping forwarding server and access service router so as to realize location privacy, simplify the processing on data messages, and avoid the data message header from being too big.

In order to solve the above technical problem, the present invention provides a system for mobile communication control, comprising an access router, which comprises a mapping manager, a message forwarding processor and a message encapsulation processor connected with the mapping manager and the message forwarding processor, wherein:

a source access router is connected with a source mobile terminal through a wireless link, and in the source access router, the mapping manager is configured to manage a mapping relationship between an identity identification and a location identification of the mobile terminal; the message encapsulation processor is configured to encapsulate the location identification according to the identity identification in a first data message sent out by the source mobile terminal to obtain a second data message; the message forwarding processor is configured to transmit a second data message to a destination access router connected to a destination mobile terminal according to the location identification encapsulated in the second data message;

the destination access router is connected with the destination mobile terminal through a wireless link, and in the destination access router, the mapping manager is configured to manage the mapping relationship between the identity identification and the location identification of the mobile terminal; the message encapsulation processor is configured to strip the location identification in the second data message and de-encapsulate the second data message into the first data message; the message forwarding processor is configured to transmit the first data message to the destination mobile terminal according to the identity identification in the first data message which is obtained by de-encapsulating the second data message.

Preferably, the system further comprises a mapping forwarding server, which comprises the mapping manager configured to manage the location identification and the identity identification of the mobile terminal, where the location identification and the identity identification of the mobile terminal are related with each other; and the system further comprises an instructor configured to perform instruction cooperation with the access router, and query, maintain, update and delete the mapping relationship between the location identification and the identity identification of the mobile terminal.

Preferably, the source access router further comprises a querier connected with the mapping manager and a message buffer connected with the message encapsulation processor; when the mapping manager of the source access router does not store the mapping relationship between the identity identification and the location identification of the destination mobile terminal:

the message buffer is configured to cache the first data message which is transmitted by the source mobile terminal firstly and whose destination address is the identity identification of the destination mobile terminal;

the querier is configured to query the mapping relationship between the identity identification and the location identification of the destination mobile terminal from the forwarding mapping server;

the mapping manager is configured to newly add the mapping relationship between the identity identification and the location identification of the destination mobile terminal according to a query result;

the message encapsulation processor is further configured to perform encapsulation processing on the first data message in the message buffer according to the newly added mapping relationship.

Preferably, the mapping forwarding server further comprises a message encapsulating and forwarding unit connected with the mapping manager, and the source access router further comprises the querier connected with the mapping manager, and when the mapping manager in the source access router does not store the mapping relationship between the identity identification and the location identification of the destination mobile terminal:

the message forwarding processor of the source access router is further configured to forward the first data message which is transmitted by the source mobile terminal firstly and whose destination address is the identity identification of the destination mobile terminal to the mapping forwarding server;

the message encapsulating and forwarding unit of the mapping forwarding server is configured to encapsulate the location identification according to the identity identification in the first data message to obtain the second data message, and route the second data message to the destination access router connected with the destination mobile terminal;

the querier of the source access router is configured to query the mapping relationship between the identity identification and the location identification of the destination mobile terminal from the mapping forwarding server; the mapping manager of the source access router is configured to newly add the mapping relationship between the identity identification and the location identification of the destination mobile terminal according to the query result.

Preferably, the access router further comprises a status notifier connected with the mapping manager, and the status notifier is configured to allocate the location identification to the mobile terminal when the mobile terminal moves to a predetermined area or the status of the mobile terminal changes; inform the mapping forwarding server of the allocated location identification of the mobile terminal; the instructor of the mapping forwarding server is configured to update the mapping relationship between the identity identification and the location identification of the mobile terminal according to the informed location identification.

Preferably, the access router further comprises an access manager connected with the status notifier and a mobility manager connected with the access manager and the message forwarding processor, and the access manager is configured to manage access information of the mobile terminal connected to the access router, and provide an access service of the mobile terminal; the mobility manager is configured to process a switching flow of the mobile terminal when the location of the mobile terminal changes, maintain a connecting relationship between the mobile terminal and the correspondent node, and initiates a routing optimization flow to the access router connected with the correspondent node when the mobile terminal switches to access.

Preferably, the system further comprises a common router, which is configured to route and forward the second data message.

Preferably, the system for mobile communication control divides a network into an access network and a backbone network, the access router is connected with the access network and the backbone network, the identity identification is used in the access network, the location identification is used in the backbone network, the identity identification and the location identification multiplex a coding space, and different mobile terminals multiplex the location identification.

In order to solve the above technical problem, the present invention further provides a method for mobile communication control, and the method comprises a flow of sending a data message from a source mobile terminal to a destination mobile terminal, and the flow includes the following steps:

A, a source access router receiving a first data message sent by the source mobile terminal, and executing step B;

B, encapsulating a location identification according to an identity identification in the first data message to obtain a second data message; forwarding the second data message to a destination access router connected to the destination mobile terminal according to the location identification in the second data message; and C, the destination access router stripping the location identification encapsulation in the second data message to return the second data message to the first data message, and forwarding the first data message to the destination mobile terminal.

Preferably, the flow of sending a data message from the source mobile terminal to the destination mobile terminal further comprises: in a mobile communication system, the source access router locally caching a mapping relationship between an identity identification and a location identification of the mobile terminal, a mapping forwarding server querying, maintaining, updating and deleting the mapping relationship between the location identification and the identity identification of the mobile terminal according to an instruction of the access router, and when the source access router receives a first data message which is firstly transmitted by the source mobile terminal and whose destination address is the identity identification of the destination mobile terminal, the source access router caching the first data message, and executing step B after obtaining the location identification of the destination mobile terminal by querying the mapping forwarding server according to the identity identification of the destination mobile terminal in the first data message.

Preferably, the flow of sending a data message from the source mobile terminal to the destination mobile terminal further comprises: in a mobile communication system, the source access router locally caching a mapping relationship between an identity identification and a location identification of the mobile terminal, a mapping forwarding server querying, maintaining, updating and deleting the mapping relationship between the location identification and the identity identification of the mobile terminal according to an instruction of the access router, and when the source access router receives a first data message which is firstly transmitted by the source mobile terminal and whose destination address is the identity identification of the destination mobile terminal, the source access router forwarding the first data message to the mapping forwarding server, and the mapping forwarding server executing step B.

Preferably, when the mobile terminal moves to the predetermined area, or the status of the mobile terminal changes, the method further comprises a status notification flow, which comprises:

the access router allocating the location identification to the mobile terminal;

the access router informing the mapping forwarding server of the allocated location identification of the mobile terminal; and the mapping forwarding server updating the mapping relationship between the identity identification and the location identification of the mobile terminal according to the informed location identification.

Preferably, the method further comprises a routing optimization flow, which comprises:

when the mobile terminal switches to access, the access router allocating a new location identification to the mobile terminal and initiating a routing optimization flow to the access router of a correspondent node; and the access router of the correspondent node updating the mapping relationship between the identity identification and the location identification of the mobile terminal in the routing optimization flow.

Preferably, the system for mobile communication control divides a network into a an access network and a backbone network, the access router is connected with the access network and the backbone network, the identity identification is used in the access network, and the location identification is used in the backbone network.

In order to solve the above technical problem, the present invention further provides a mapping forwarding server applied in a mobile communication network, and the mapping forwarding server comprises:

a mapping manager, which is configured to manage a location identification and an identity identification of a mobile terminal;

an instructor, which is configured to perform instruction cooperation with an access router, and query, maintain, update and delete a mapping relationship between the location identification and the identity identification of the mobile terminal;

a message encapsulating and forwarding unit, which is configured to encapsulate the location identification according to the identity identification in a first data message to obtain a second data message, and route and forward the second data message to a destination access router connected with a destination mobile terminal.

In order to solve the above technical problem, the present invention further provides an access router, comprising:

a mapping manager, which is used to manage a mobile terminal connected to the access router and a mapping relationship between an identity identification and a location identification of a correspondent node;

a message encapsulation processor, which is configured to add encapsulation of the location identification according to the identity identification in a first data message sent out by the mobile terminal and the mapping relationship in the mapping manager to obtain a second data message, and strip the location identification encapsulation in the second data message sent to the mobile terminal to obtain the first data message; and a message forwarding processor, which is configured to receive the first data message from the mobile terminal, receive the second data message from the access router connected with the correspondent node, and transmit the first data message to the mobile terminal and transmit the second data message to the access router connected with the correspondent node.

Preferably, when the access router is a source access router, the source access router further comprises a querier connected with the mapping manager and a message buffer connected with the message encapsulation processor; when the mapping manager of the source access router does not store the mapping relationship of the destination mobile terminal:

the message buffer is configured to cache the first data message which is transmitted by the source mobile terminal firstly and whose destination address is the identity identification of the destination mobile terminal;

the querier is configured to query the mapping relationship between the identity identification and the location identification of the destination mobile terminal from the forwarding mapping server;

the message encapsulation processor is further configured to perform encapsulation processing on the first data message in the message buffer according to a newly added mapping relationship.

Preferably, when the access router is a source access router, the source access router further comprises the querier connected with the mapping manager, and when the mapping manager in the source access router does not store the mapping relationship between the identity identification and the location identification of the destination mobile terminal:

the message forwarding processor is further configured to forward the first data message which is transmitted by the source mobile terminal firstly and whose destination address is the identity identification of the destination mobile terminal to the mapping forwarding server;

the querier is configured to query the mapping relationship between the identity identification and the location identification of the destination mobile terminal from the forwarding mapping server; the mapping manager is configured to newly add the mapping relationship between the identity identification and the location identification of the destination mobile terminal according to the query result.

Preferably, the access router further comprises a status notifier connected with the mapping manager, and the status notifier is configured to allocate the location identification to the mobile terminal when the mobile terminal moves to a predetermined area or the status of the mobile terminal changes; inform the mapping forwarding server of the allocated location identification of the mobile terminal.

Preferably, the access router further comprises an access manager and a mobility manager connected with the access manager, and the access manager is configured to manage access information of the mobile terminal connected to the access router, and provide an access service of the mobile terminal; the mobility manager is configured to process a switching flow of the mobile terminal when the location of the mobile terminal changes, maintain a connecting relationship between the mobile terminal and the correspondent node, and initiates a routing optimization flow to the access router connected with the correspondent node when the mobile terminal switches to access.

In the method and system for mobile communication control in the present invention, the access server (ASR) encapsulates the location identification (RID) according to the identity identification (AID) in the data message sent by the mobile terminal, and de-encapsulates the data message sent by the network side, so as to realize location privacy, simplify the processing of the data message, and avoid the header of the data message from being too big.

PREFERRED EMBODIMENTS OF THE INVENTION

The main concept of the method and system for mobile communication control in the present invention is that the access router (ASR) encapsulates the location identification (RID) according to the identity identification (AID) in the data message sent by the mobile terminal, and de-encapsulates the data message sent by the network side, so as to realize location privacy, simplify the processing of the data message, and avoid the header of the data message from being too big.

In the mobile communication system of the present invention, the network is divided into an access network and a backbone network, a unique identity identification (also called as access identification, which is AID in short) is allocated to each user in the network, and this identity identification always keeps unchanged during the movement; there are two types of identifications in the network: identity identification and location identification (also called as routing Identification, which is RID in short), wherein, the identity identification of the user can only be used in the access network and the location identification can only be used in the backbone network. The identity identification and location identification, as well as their application scopes and logic meanings are defined in the mobile communication control system of the present invention. This mechanism separates the dual attributes of identity and location of the IP address. The identity identification and location identification in the present system may adopt the format of IP address, or may adopt other formats different from the IP address. When the identity identification and location identification in the present system adopt the format of IP address: in the acting domain of the identity identification, the identity identification in the format of IP address only represents the identity attribute. In the acting domain of the location identification, the location identification in the format of IP address only represents the location attribute. Since the functional sub-set of IPV4/IPV6 address is defined in the existing standard specification, the conflict in the existing standard does not exist, and the compatibility is good. Since the acting domains and logic meanings of the identity identification and location identification in the system for mobile communication control of the present invention are different, their code segment resources can be multiplexed. Meanwhile, the location identification in the system for mobile communication control of the present invention only identifies the user location, and the mobile terminals located in the same location area can use the same location identification. These mobile terminals using the same location identification in the same location area use different identity identifications to distinguish the identities. In this way, the system for mobile communication control of the present invention achieves the effect of saving coding resources.

Figure 1:
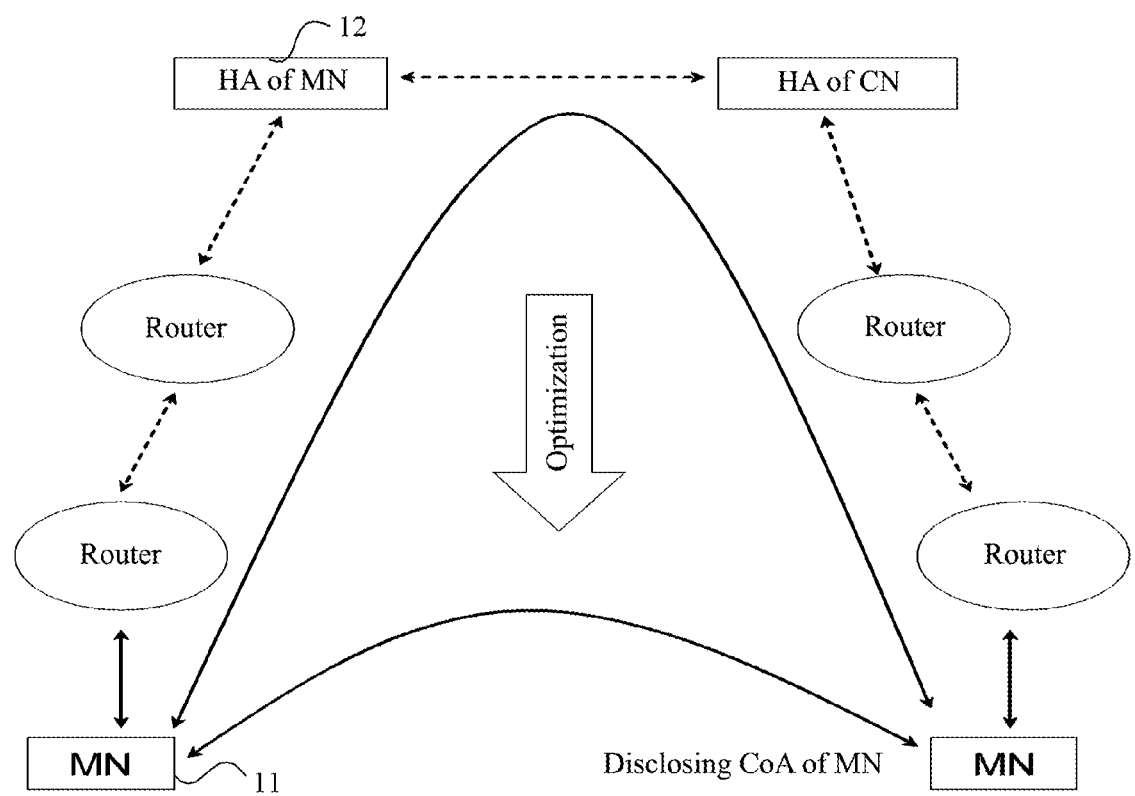
FIG. 1 illustrates a basic mobile IP system.
Figure 2:
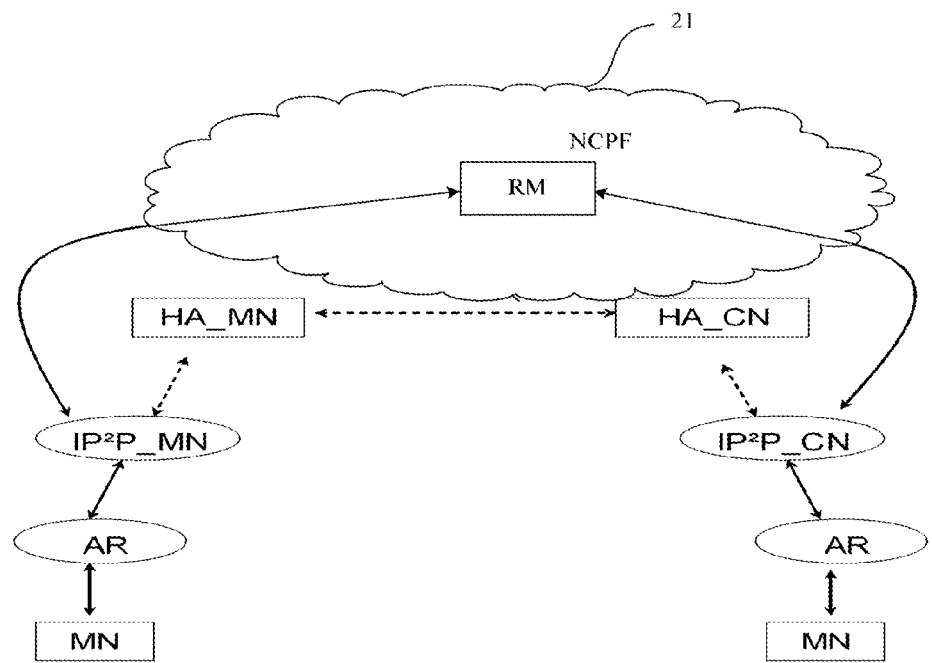
FIG. 2 illustrates an $IP^2$ system architecture.
Figure 3:
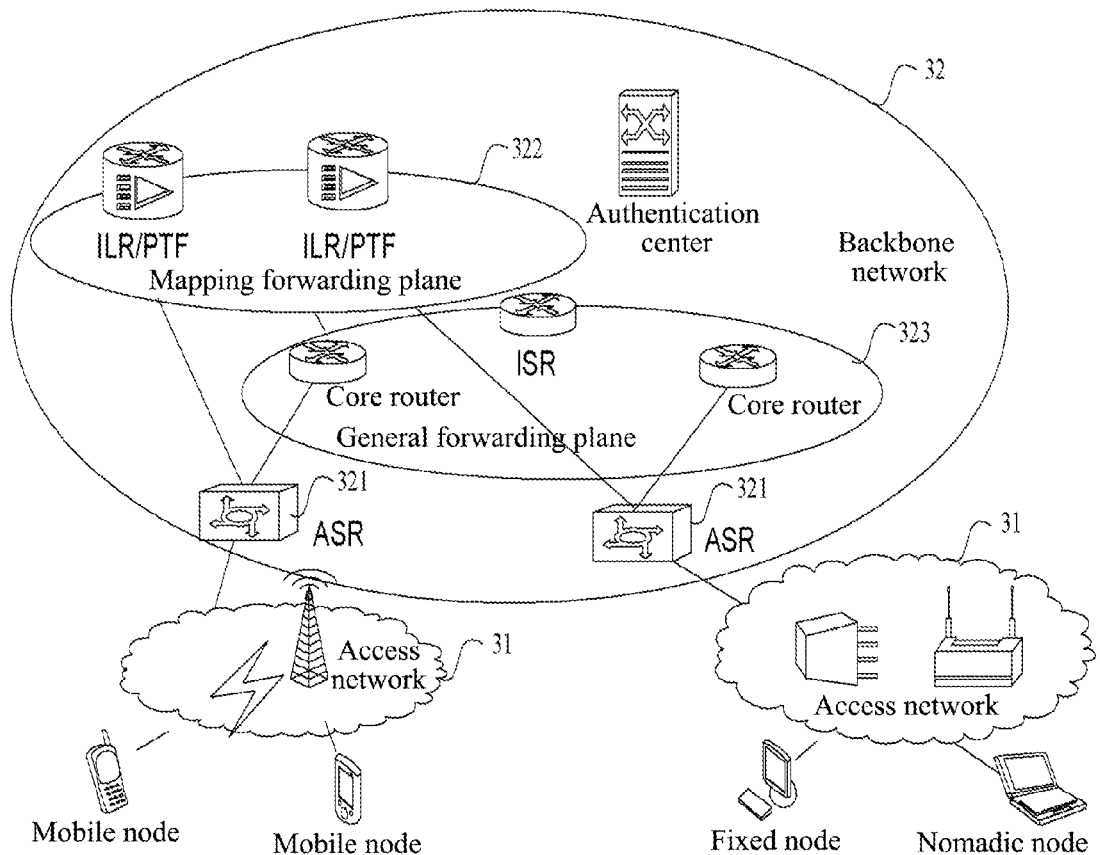
FIG. 3 is an overall block diagram of the system for mobile communication control according to the present invention.

As shown in FIG. 3, the system for mobile communication control of the present invention divides the network into an access network 31 and a backbone network 32, a unique identity identification is allocated to each user in the network, and this identity identification always keeps unchanged during the movement process; there are two types of identifications in the network: identity identification and location identification, wherein, the identity identification of the user can only be used in the access network and the location identification can only be used in the backbone network. The access network is located on the border of the backbone network, and is responsible for access of all terminals, while the backbone network is responsible for routing of different terminals accessing via the access network. The Access Service Router (ASR) 321 is located on the demarcation point of the backbone network 32 and the access network 31, and is interfaced with the access network and the backbone network. There is no overlap of the access network and the backbone network in the topology relationship. Communication between the user terminals is implemented only using the identity identification of the opposite end. The ASR provides access services for the terminals, maintains user connection and forwards user data. The mapping forwarding server (ILR/PTF) maintains/stores the AID-RID mapping relationship of a user, implements registration function, and processes the location query flow of the correspondent node.

The IP protocol is initially designed for fixed access scene mainly, and an IP address includes dual attributes of identity and location. The identity attribute of the IP address: the IP address is used to identify the correspondent node in the transmission control protocol (TCP)/IP protocol stack. The location attribute of the IP address: the IP address represents which network segment the user is located, and is the basis of routing.

The identity identification and location identification, as well as their application scopes and logic meanings are defined in the mobile communication control system of the present invention. This mechanism separates the dual attributes of identity and location of the IP address. The identity identification and location identification in the present system may adopt the format of IP address, or may adopt other formats different from the IP address. When the identity identification and location identification in the present system may adopt the format of IP address: in the acting domain of the identity identification, the identity identification in the format of IP address only represents the identity attribute. In the acting domain of the location identification, the location identification in the format of IP address only represents the location attribute. Since the functional sub-set of IPV4/IPV6 address is defined in the existing standard specification, the conflict in the existing standard does not exist, and the compatibility is good.

Since the acting domains and logic meanings of the identity identification and location identification in the system for mobile communication control of the present invention are different, their code segment resources can be multiplexed. For example, the identity identification of a certain mobile terminal is 10.1.1.1, and its location identification may also be 10.1.1.1.

Meanwhile, the location identification in the system for mobile communication control of the present invention only identifies the user location, and the mobile terminals located in the same location area can use the same location identification. These mobile terminals using the same location identification in the same location area use different identity identifications to distinguish the identities. In this way, the system for mobile communication control of the present invention achieves the effect of saving coding resources.

As shown in FIG. 3, the backbone network 32 forms two logically independent functional planes: a mapping forwarding plane 322 and a general forwarding plane 323.

The main function of the general forwarding plane is to route and forward a data message according to the location identification in the data message.

The main function of the mapping forwarding plane is to store the identity identification-location identification mapping information of the mobile node, process the registration flow of the mobile node, and process the location query flow of the correspondent node. Optionally, the data message of which the destination address is identified with the identity is forwarded.

When the Mobile Node (MN) is started or changes in location, the access router where the MN is located initiates a registration flow to the mapping forwarding plane, and the mapping forwarding plane processes the registration flow of the MN, and stores the identity identification-location identification mapping relationship of the registration information.

The mapping forwarding plane routes and forwards the data message according to the AID in the data message, and returns the AID-RID mapping relationship to the requester.

The ASRc where the correspondent node (CN) is located firstly queries, after receiving the data message sent by the CN, the local mapping table, and if the AIDm-RIDm mapping is queried out, the ASRc adds the RIDm routing information to the data message, and delivers the data message to the general forwarding plane for forwarding processing. After the ASRc where the CN is located receives the data message sent by the CN, if the ASRc does not query out the AIDm-RIDm mapping table items, the ASRc initiates a query flow to the ILR. Meanwhile, optionally the data message is delivered to the general forwarding plane for forwarding processing. During mapping query, optionally the ASRc can also cache the data message sent from the CN to the MN. After obtaining the AIDm-RIDm mapping table items, the RIDm routing information is added in the related data message, and the data message is delivered to the general forwarding plane for forwarding processing.

The First Example

Figure 4:
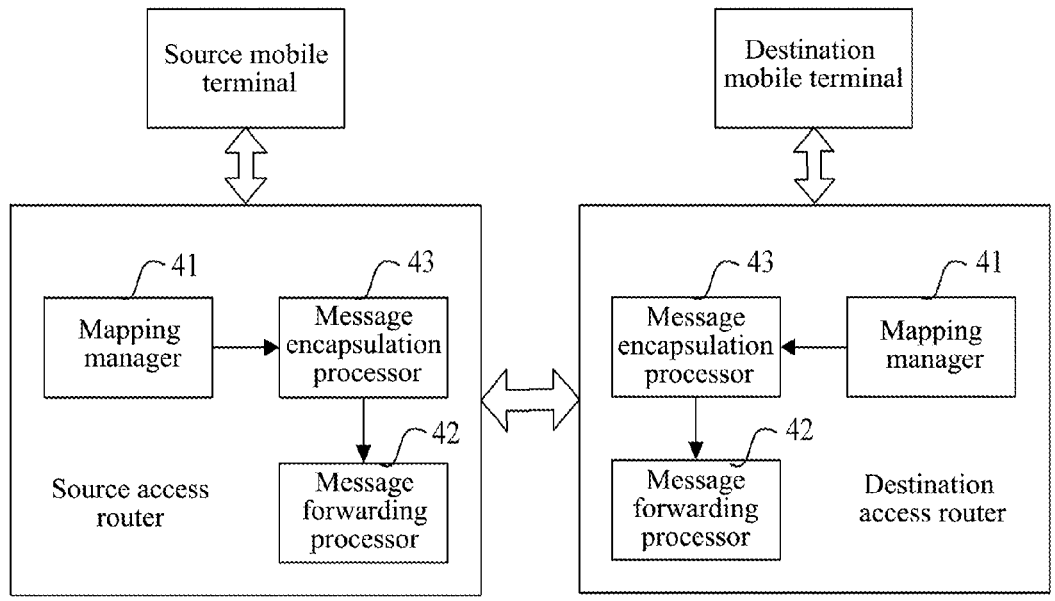
FIG. 4 is a functional block diagram of the first example of the system for mobile communication control according to the present invention.

The access router in the first example of the system for mobile communication control according to the present invention will be described below with reference to FIG. 4. As shown in FIG. 4, the access router comprises a mapping manager 41, a message forwarding processor 42 and a message encapsulation processor 43 connected with the mapping manager and the message forwarding processor, wherein:

the source access router is connected with a source mobile terminal through a wireless link, and in the source access router:

the mapping manager 41 is configured to manage a mapping relationship between an identity identification and a location identification of the mobile terminal.

For example, the identity identification of MT#1 is AID, and MT#1 accesses ASR#1, the ASR#1 allocates location identification RID1 to the MT#1, and in this case, the mapping manager 41 of the ASR#1 stores the mapping relationship AID-RID1 of MT#1.

The message encapsulation processor 42 is configured to encapsulate the location identification according to the identity identification in a first data message sent out by the source mobile terminal to obtain a second data message;

the message forwarding processor 43 is configured to transmit the second data message to a destination access router connected to a destination mobile terminal according to the location identification encapsulated in the second data message;

the destination access router is connected with the destination mobile terminal through a wireless link, and in the destination access router:

the mapping manager 41 is configured to manage the mapping relationship between the identity identifier and the location identifier of the mobile terminal;

the mapping relationship managed by the mapping manager 41 of the source ASR includes the mapping relationship of the source mobile terminal connected to the source ASR, or includes, as needed, the mapping relationship of the destination mobile terminal communicating with the source mobile terminal; likewise, the mapping relationship managed by the mapping manager of the destination ASR includes the mapping relationship of the destination mobile terminal connected to the destination ASR, or includes, as needed, the mapping relationship of the source mobile terminal communicating with the destination mobile terminal.

The message encapsulation processor 42 is configured to strip the location identification in the second data message and de-encapsulate the second data message into the first data message;

the message forwarding processor 43 is configured to transmit the first data message to the destination mobile terminal according to the identity identification in the de-encapsulated first data message.

The Second Example

Figure 5:
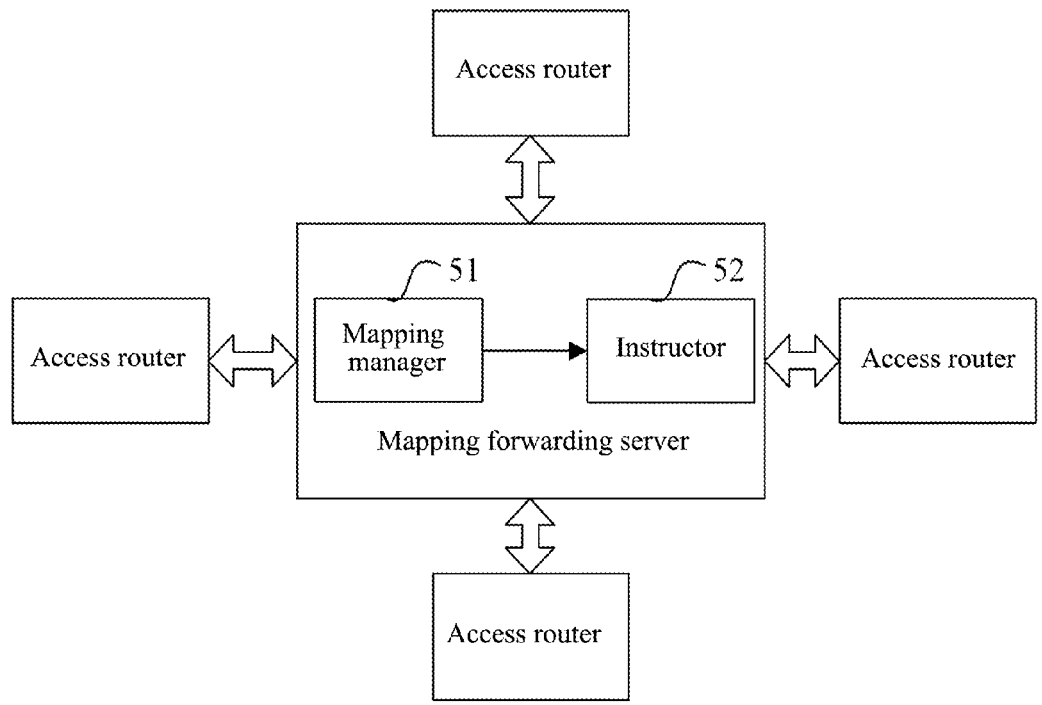
FIG. 5 is a functional block diagram of the second example of the system for mobile communication control according to the present invention.

In the second example of the mobile communication system of the present invention, in addition to the access router as shown in FIG. 4, the system further comprises a mapping forwarding server, which, as shown in FIG. 5, comprises:

a mapping manager 51, which is configured to manage the location identification and the identity identification of the mobile terminal, where the location identification and the identity identification of the mobile terminal are related with each other; and an instructor 52, which is configured to perform instruction cooperation with the access router, and query, maintain, update and delete the mapping relationship between the location identification and the identity identification of the mobile terminal.

For example, MT#1 initiates data communication to the correspondent node (CN), the destination address of the data message sent by the MT#1 is the identity identification AIDc of the CN, the access router ASR#1 where the MT#1 is located does not store the mapping between the AIDc of the CN and its location identification RIDc, the ASR#1 initiates a mapping query flow to the mapping forwarding server, an instructor 12 in the mapping forwarding server, when receiving a query request from the ASR#1, query the mapping manager 51, and after obtaining the query result, the instructor 52 constructs a signaling message to return the query result to the requestor.

The mapping forwarding server can update the mapping relationship between the identity identification and the location identification of the destination mobile terminal according to the change of the location or status of the mobile terminal.

For example, the identity identification of MT#1 is AID, the MT#1 accesses the ASR#1, and the ASR#1 allocates a location identification RID1 to MT#1, and at this moment, the mapping manager 51 of the mapping forwarding server stores the mapping relationship AID-RID1 of the MT#1. When MT#1 moves from ASR#1 to the area of ASR#2, ASR#2 allocates a new location identification RID2 to MT#1, and initiates update to the mapping forwarding server, and the instructor 52 of the mapping forwarding server, after receiving an update message, informs the mapping manager 51 to update the mapping relationship of MT#1 to AID-RID2.

The Third Example

Figure 6:
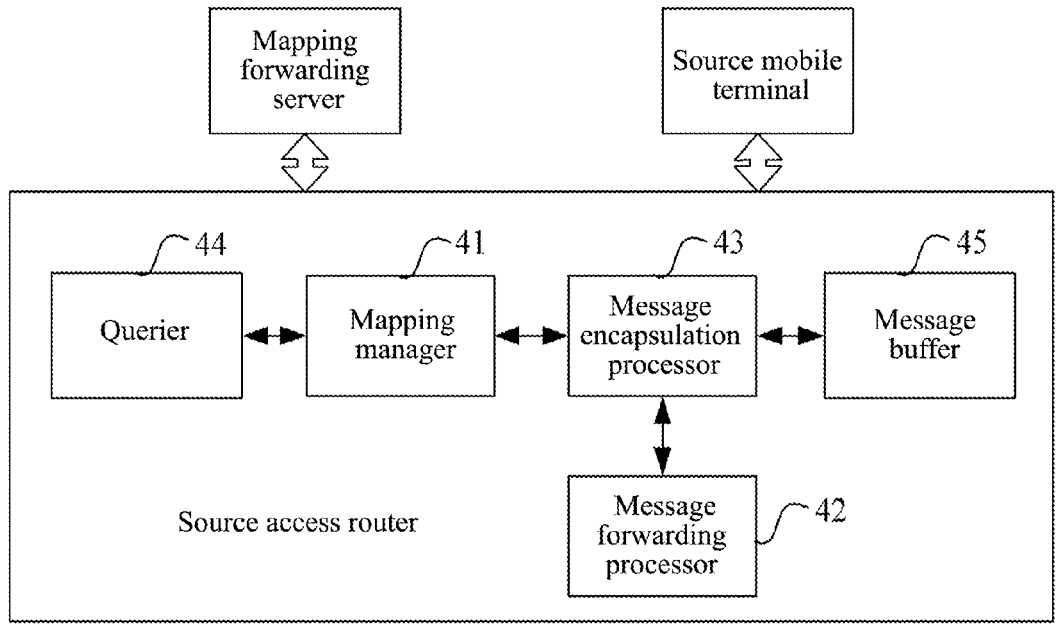
FIG. 6 is a functional block diagram of the third example of the system for mobile communication control according to the present invention.
Figure 7:
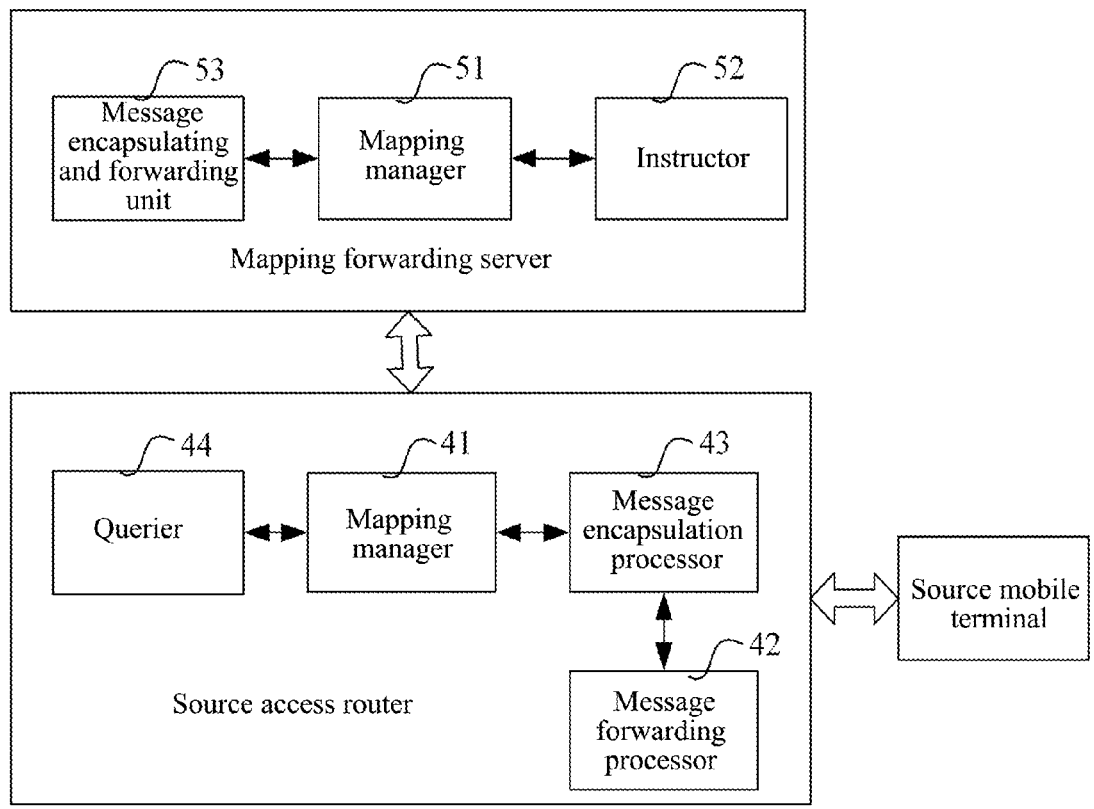
FIG. 7 is a functional block diagram of the fourth example of the system for mobile communication control according to the present invention.

In order to realize forwarding of the message firstly transmitted by the source mobile terminal, an alternative solution is provided below: the third example of the system for mobile communication control. Different from the second example, the source access router further comprises a querier 44 connected with the mapping manager 41 and a message buffer 45 connected with the message encapsulation processor 43, which are as shown in FIG. 6. When the mapping manager 41 of the source access router does not store the mapping relationship of the destination mobile terminal:

the message buffer 45 is configured to buffer the first data message which is transmitted by the source mobile terminal firstly and whose destination address is the identity identification of the destination mobile terminal;

the querier 44 is configured to query the mapping relationship between the identity identification and the location identification of the destination mobile terminal from the forwarding mapping server.

For example, the identity identification of MT#1 is AID1, and MT#1 accesses ASR#1. The identity identification of MT#2 is AID2, and MT#1 accesses ASR#2. ASR#2 allocates location identification RID2 to the MT#2. MT#1 initiates data communication to MT#2. ASR#1 initiates a mapping query process to the mapping forwarding server through the querier 44, and after the mapping query process, ASR#1 obtains the mapping relationship AID2-RID2 of MT#2.

The mapping manager 41 is configured to newly add the mapping relationship between the identity identification and the location identification of the destination mobile terminal according to a query result;

the message encapsulation processor 43 is further configured to perform encapsulation processing on the first data message in the message buffer according to the newly added mapping relationship.

When the source access router receives the first message transmitted by the source mobile terminal, if the source access router does not store the mapping relationship between the identity identification and the location identification of the destination mobile terminal, a mapping query process will be implemented between the source access router and the mapping forwarding router. The data message sent out by the mobile terminal during this process can be cached by the source access router, and after completion of the mapping query process, the source access router obtains the mapping relationship between the identity identification and the location identification of the destination mobile terminal, and then adds a corresponding location identification encapsulation to the cached data message and sends the data message to the destination access router connected with the destination mobile terminal.

The Fourth Example

In order to realize forwarding of the message firstly transmitted by the source mobile terminal, another alternative solution is provided below: the fourth example of the system for mobile communication control. Different from the second example, the mapping forwarding server further comprises a message encapsulating and forwarding unit 53 connected with the mapping manager 51, and the source access router further comprises the querier 44 connected with the mapping manager, and when the mapping manager in the source access router does not store the mapping relationship between the identity identification and the location identification of the destination mobile terminal:

the message forwarding processor 42 of the source access router is further configured to forward the first data message which is transmitted by the source mobile terminal firstly and whose destination address is the identity identification of the destination mobile terminal to the mapping forwarding server;

the message encapsulating and forwarding unit 53 of the mapping forwarding server is configured to encapsulate the location identification according to the identity identification in the first data message to obtain the second data message, and route and forward the second data message to the destination access router connected with the destination mobile terminal;

the querier 44 of the source access router is configured to query the mapping relationship between the identity identification and the location identification of the destination mobile terminal from the mapping forwarding server; the mapping manager 41 is configured to newly add the mapping relationship between the identity identification and the location identification of the destination mobile terminal according to the query result.

When the source access router receives the first message transmitted by the source mobile terminal, if the source access router does not store the mapping relationship between the identity identification and the location identification of the destination mobile terminal, a mapping query process will be implemented between the source access router and the mapping forwarding router. The data message sent out by the mobile terminal during this process can be sent to the corresponding mapping forwarding server by the source access router, the mapping forwarding server adds a corresponding location identification encapsulation according to the identity identification in the destination address, and sends the data message to the destination access router connected with the destination mobile terminal.

The Fifth Example

Figure 8:
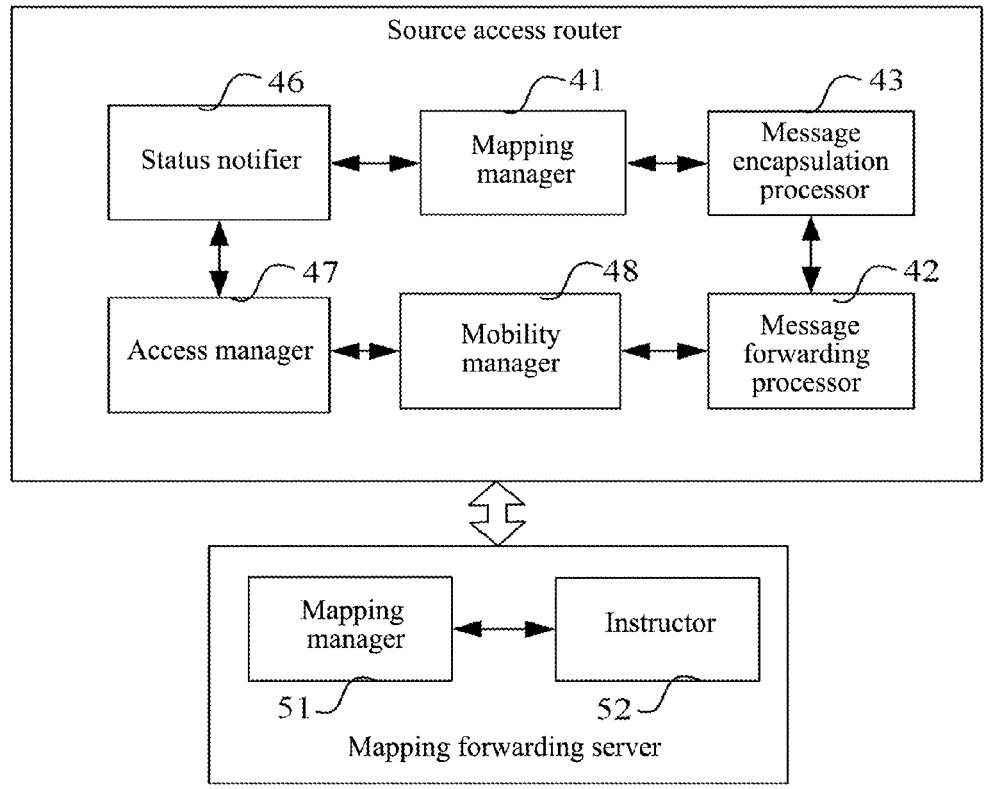
FIG. 8 is a functional block diagram of the fifth example of the system for mobile communication control according to the present invention.

In order to achieve mapping relationship update of the mobile terminal, as shown in FIG. 8, different from the second example, the access router further comprises a status notifier 46 connected with the mapping manager, and the status notifier is configured to allocate the location identification to the mobile terminal when the mobile terminal moves to a predetermined area or the status of the mobile terminal changes; and is also configured to inform the mapping forwarding server of the allocated location identification of the mobile terminal; the instructor 52 of the mapping forwarding server is configured to update the mapping relationship between the identity identification and the location identification of the mobile terminal according to the notification.

For example, the identity identification of MT#1 is AID, and MT#1 accesses ASR#1. ASR#1 allocates location identification RID1 to MT#1. At this moment, the mapping manager 51 of the mapping forwarding server stores the mapping relationship AID-RID1 of MT#1, and the mapping manager 41 of the access router ASR#1 stores the mapping relationship AID-RID1 of MT#1. When MT#1 moves from ASR#1 to the area of ASR#2, ASR#2 allocates new location identification RID2 to MT#1, and the status notifier 46 of ASR#2 initiates an update flow to the mapping forwarding server.

The Sixth Example

Different from the first and second examples, as shown in FIG. 8, the access router further comprises an access manager 47 connected with the status notifier 46 and a mobility manager 48 connected with the access manager 47 and the message forwarding processor 42, and the access manager 47 is configured to manage access information of the mobile terminal connected to the access router, and provide an access service of the mobile terminal; the mobility manager 48 is configured to process a switching flow of the mobile terminal when the location of the mobile terminal changes, maintain a connecting relationship between the mobile terminal and the correspondent node, and initiates a routing optimization flow to the access router connected with the correspondent node when the mobile terminal switches to access, so that the transmission path of the data message between the two communication ends is shorter.

For example, the identity identification of MT#1 is AID1, MT#1 accesses ASR#1, and ASR#1 allocates a location identification RID1 to MT#1. The identity identification of MT#2 is AID2, MT#2 accesses ASR#2, and ASR#2 allocates a location identification RID2 to MT#2. MT#1 is having a data communication with the MT#2. When MT#1 moves from ASR#1 to the area of ASR#3, the mobility managers of ASR#1 and ASR#3 implement a switching processing flow, and ASR#3 allocates a location identification RID3 to MT#1. The status notifier 46 of ASR#3 will initiates an update flow to the mapping forwarding server to update the mapping relationship AID1-RID3 of MT#1 in the mapping forwarding server; the mobility manager 48 of ASR#3 will initiate a routing optimization flow to the ASR#2 where MT#2 is located. During the outing optimization flow, the mapping manager 35 of ASR#2 will update the mapping relationship of MT#1 to AID1-RID3. During the switching process, ASR#1 will forward the data message between ASR#2 and ASR#3.

It can be appreciated that the source ASR and destination ASR are determined according to the source mobile terminal and destination mobile terminal in the communication, and surely there is the case where the source ASR and destination ASR are the same ASR. The source ASR and destination ASR are a pair of relative ASRs, and for different mobile terminals, any ASR may be the source ASR and destination ASR simultaneously.

The method for mobile communication control of the present invention comprises a flow of sending a data message from a source mobile terminal to a destination mobile terminal.

Figure 9:
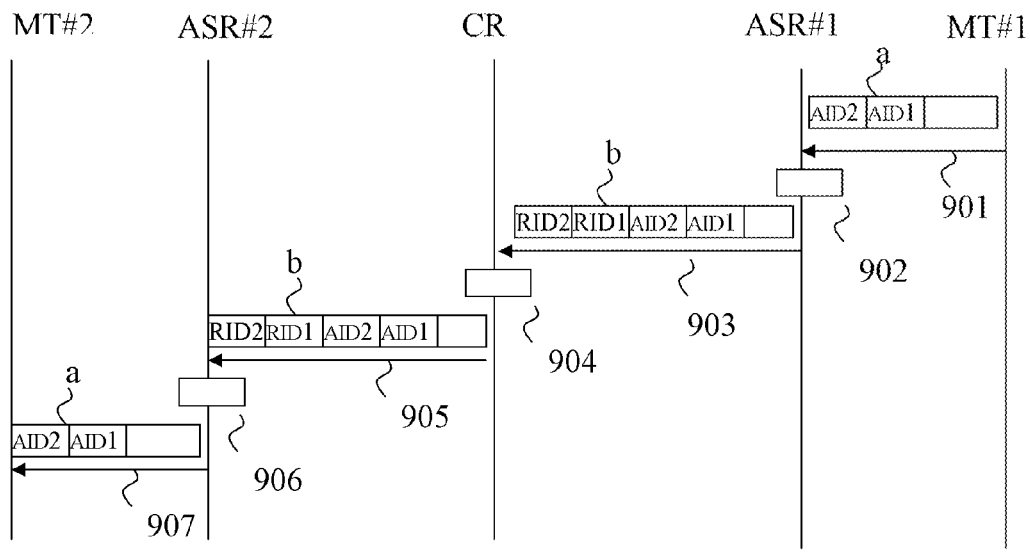
FIG. 9 illustrates the process of data message transmission in the method for mobile communication control according to the present invention.

As shown in FIG. 9, the flow of a mobile terminal MT#1 (source mobile terminal) sending a data message to a mobile terminal MT#2 (destination mobile terminal) comprises the following steps.

In step 901, the mobile terminal (source mobile terminal) MT#1 transmits a data message "a" to the source access router ASR#1 through the connection with the source access router.

The identity identification AID2 of the mobile terminal (destination mobile terminal) MT#2 is configured as the destination address in the data message "a", and the identity identification AID1 of the mobile terminal (source mobile terminal) MT#1 is configured as the source address in the data message "a".

In step 902, the access router ASR#1 adds location identification encapsulation of the destination mobile terminal and source mobile terminal to the data message "a" according to the mapping routing table in the mapping manager, thereby forming a data message "b".

When the source access router receives the first data message which is transmitted firstly by the source mobile terminal and whose destination address is the identity identification of the destination mobile terminal, the source access router caches the first data message, and queries the obtained location identification of the destination mobile terminal from the mapping forwarding server according to the identity identification of the destination mobile terminal in the first data message and then performs message encapsulation.

In step 903, the access router ASR#1 performs routing according to the location identification of the destination mobile terminal MT#2 and sends the data message "b" to the common router CR.

In step 904, the common router CR transmits the data message in the packet data network according to the destination address of the data message "b".

Depending on different networking environments, it is possible that there is no common router CR between the ASR#1 and ASR#2, or there are a plurality of CRs.

In step 905, the CR sends the data message "b" to the destination access router ASR#2.

In step 906, ASR#2 strips the location identification encapsulation of the data message "b", and returns it to the data message "a".

In step 907, the destination access router ASR#2 sends the data message to the destination mobile terminal MT#2 through the link connecting the destination mobile terminal MT#2 to ASR#2.

In the above flow, for the data message firstly transmitted from the source mobile terminal MT#1 to the destination mobile terminal MT#2, it can also be encapsulated and forwarded by the mapping forwarding server, that is, when the source access router receives a first data message which is firstly transmitted by the source mobile terminal and whose destination address is the identity identification of the destination mobile terminal, the source access router forwards the first data message to the mapping forwarding server, and the mapping forwarding server encapsulates the data message and forwards it to ASR#2.

When the mobile terminal moves to a the predetermined area, or the status of the mobile terminal changes, the method further comprises a status notification flow, which comprises:

the access router allocating the location identification to the mobile terminal;

the access router informing the mapping forwarding server of the allocated location identification of the mobile terminal; and the mapping forwarding server updating the mapping relationship between the identity identification and the location identification of the mobile terminal according to the informing.

The method further comprises a routing optimization flow, which comprises:

when the mobile terminal switches to access, the access router allocating a new location identification to the mobile terminal and initiating a routing optimization flow to the access router of a correspondent node; and the access router of the correspondent node updating the mapping relationship between the identity identification and the location identification of the mobile terminal in the routing optimization flow.

The switching management process (including the status notification flow and the routing optimization flow) will be descried below in detail with reference to FIG. 10.

Figure 10:
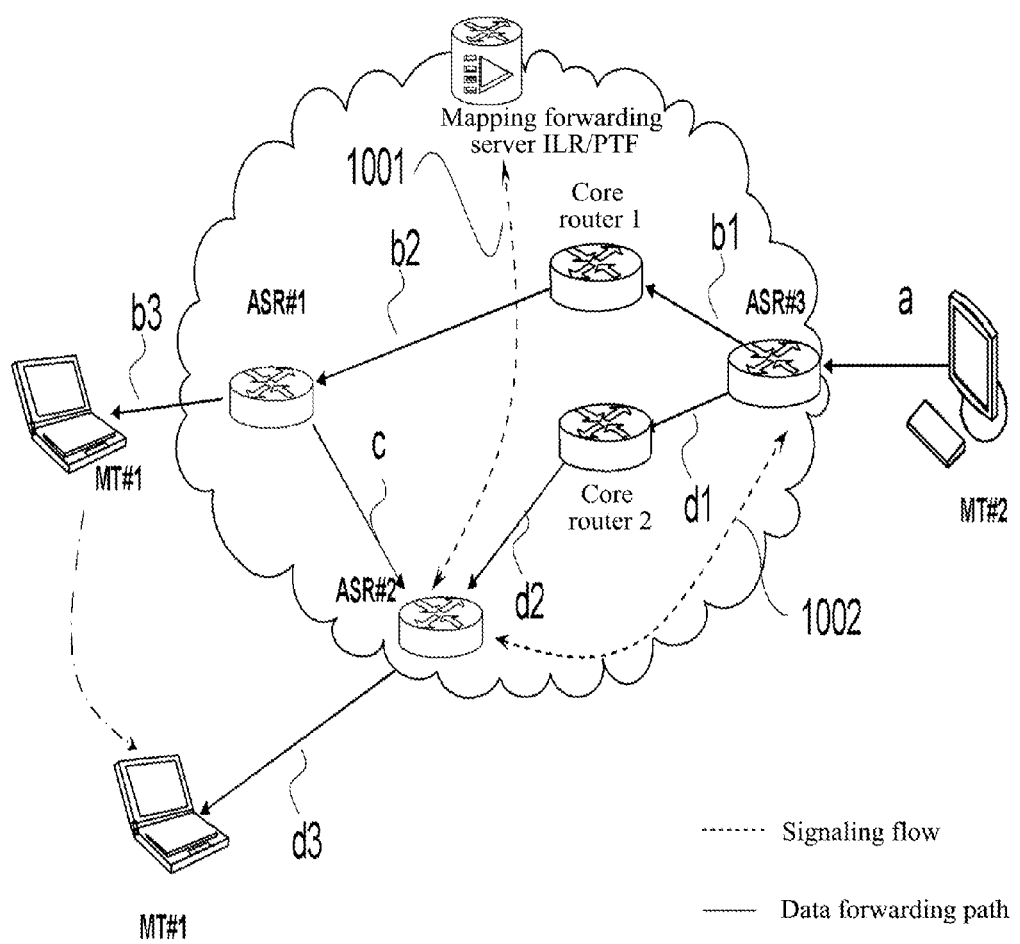
FIG. 10 illustrates the process of switching management in the method for mobile communication control according to the present invention.

As shown in FIG. 10, the mobile terminal MT#1 is having a data communication with the mobile terminal MT#2. Wherein, the mobile terminal MT#2 transmits and receives data messages through the link connected to the access router ASR#3, and the mobile terminal MT#1 transmits and receives data messages through the link connected to the access router ASR#1. During this process, the data message forwarding path between MT#1 and MT#2 is a<--->b1<--->b2<--->b3, at which moment, the MT#1 has the data communication with MT#2 using the location identification RID1 allocated by the access router ASR#1, and the location identification RID1 is associated with the identity identification AID1 of MT#1.

During the communication, the communication system will always record updating or deleting the correspondent node communicating with the mobile terminal MT#1. The functional entity for storing the information of the correspondent node in the communication system may be the access router ASR or the mapping server ILR. Correspondingly, the information of MT#2 is stored in the system.

During the communication process, the location of mobile terminal MT#1 is moved from the area covered by the access router ASR#1 to the area covered by the access router ASR#2. The system initiates a switching management process after detecting movement of the mobile terminal MT#1. The present invention does not have any specific requirements on the process of initiating a switching, and can realize compatibility with the existing access network pattern without changing the interfaces between the system and the terminal, including but not limited to Wireless Fidelity (WiFi), Wideband Code Division Multiple Access (WCDMA), Code Division Multiple Access (CDMA), Long Term Evolution (LTE), Worldwide Interoperability for Microwave Access (WiMAX), etc. This process of initiating switching through mobility detection is implemented according to the specific network pattern.

For example, in a WiFi network, this process of initiating a switching is initiated by the terminal. In a WCDMA network, the process of initiating a switching is initiated by a radio network controller (RNC).

In step 1001, the switch-in access router ASR#2 allocates new location identification RID2 to the MT#1, and the location identification RID2 is associated with the identity identification AID1 of MT#1.

The switch-in access router ASR#2 registers the new location identification RID2 to the mapping forwarding server ILR/PTF, the ILR/PTF updates the corresponding mapping routing table and updates the location identification RID1 corresponding to the identity identification AID1 to RID2. The correspondent node of the newly established data communication queries out the new location identification RID2 of the mobile terminal MT#1, and at this moment MT#1 implements data communication with the correspondent node of the newly established data communication using the location identification RID2 allocated by the access router ASR#2.

In step 1002, routing optimization is implemented, the switch-in access router ASR#2 queries the information of the correspondent node stored by the communication system, informs the access router ASR#3 where the correspondent node MT#2 is located of the new location identification RID2, the access router ASR#3 updates the corresponding mapping routing table, and updates the location identification RID1 corresponding to the identity identification AID1 to RID2. Afterwards, the data message forwarding path between MT#1 and MT#2 is a<--->d1<--->d2<--->d3.

Since step 1002 has a time delay, during the switching process, ASR#1 forwards the data messages during the transfer and switching process between MT#1 and MT#2, and at this moment the data message forwarding path between MT#1 and MT#2 is a<--->b1<--->b2<--->c<--->d3.

There is not time order for steps 1001 and 1002.

During the switching management process of the system for mobile communication control, the switching initiation process depends on the specific wireless access mode, and the routing optimization process is implemented after the switch-in access router ASR allocates a new location identification to the switched mobile terminal. Regardless of the access mode, the switch-in access router ASR can perceive the step of allocating the new location identification, thereby implementing the routing optimization process without monitoring, detecting or traversing all data messages sent out by the mobile terminal MN.

The communication system, routing control method and device proposed by the present invention have the following features:

(1) MN and CN only need to know the identity identification of the opposite end for communication, thereby achieving location privacy;

(2) the data message can be transmitted in the core network only though simple encapsulation and de-encapsulation, thereby simplifying the message processing process and avoiding the problem of over-big message header;

(3) the implementation process does not require participation of the terminal, and the upgrading and compatibility issues of the terminal do not need to be considered in the deployment process;

(4) the location identification in the present invention can be multiplexed between different terminals, thereby saving code resources;

(5) the identity identification and location identification coding space can be multiplexed in the present invention, thereby saving coding resources;

(6) the identity identification and location identification involved in the present invention are compatible with the IPv4/IPv6 address definition in the existing regulation standards; the number of available IPv4/IPv6 addresses is not reduced, there is no potential possibility of being conflicting with the existing protocol specification, and the IPv4/IPv6 address definition in the existing regulation standard is not modified;

(7) when the mobile terminal MT#1 is communicating with the correspondent nodes MT#2, MT#3 . . . MT#n, the mobile terminal MT#1 switches, the routing optimization process is implemented between the access router ASR#1 accessed by the MT#1 and ASR#2, ASR#3 . . . ASR#n where the correspondent nodes of MT#1 are located, and the present invention explicitly describes the method for the access router ASR#1 to obtain the routing information of the related access routers ASR#2, ASR#3 . . . ASR#n;

(8) the routing optimization process of the present invention is directly implemented between the access routers of the two communication ends, eliminating unnecessary fault nodes and simplifying the operation flow, without the need of monitoring, detecting or traversing all data messages sent out by the mobile terminal MN for the routing optimization process.

A person having ordinary skill in the art can appreciate that all of part of the steps of the above method may be implemented by instructing related hardware with a program, which may be stored in a computer-readable medium, such as a read-only memory, a magnetic disk or an optical disk. Optionally, all of part of the steps of the above examples may also be implemented by using one or more integrated circuits. Correspondingly, each module/unit in the above examples may be implemented in the form of hardware, or in the form of software functional modules. The present invention is not limited to any particular form of combination of hardware and software.

INDUSTRIAL APPLICABILITY

In the method and system for mobile communication control in the present invention, the access server encapsulates the location identification (RID) according to the identity identification in the data message sent by the mobile terminal, and de-encapsulates the data message sent by the network side, so as to realize location privacy; the data message can be transmitted in the core network only after simple encapsulation and de-encapsulation, thereby simplifying the message processing process and avoiding the problem of over-big message header; the implementation process does not require participation of the terminal, and the upgrading and compatibility issues of the terminal do not need to be considered in the deployment process; the location identification in the present invention can be multiplexed between different terminals, thereby saving code resources; the identity identification and location identification coding space can be can be multiplexed in the present invention, thereby saving coding resources; the routing optimization process of the present invention is directly implemented between the access routers of the two communication ends, eliminating unnecessary fault nodes and simplifying the operation flow, without the need of monitoring, detecting or traversing all data messages sent out by the mobile terminal MN for the routing optimization process.

What is claimed is:

1. A system for mobile communication control, comprising an access router, which comprises a mapping manager, a message forwarding processor, and a message encapsulation processor connected with the mapping manager and the message forwarding processor, wherein:

when the access router acts as a source access router connected with a source mobile terminal through a wireless link, in the source access router, the mapping manager is configured to manage a mapping relationship between an identity identification and a location identification of the mobile terminal; the message encapsulation processor is configured to encapsulate the location identification according to the identity identification in a first data message sent out by the source mobile terminal to obtain a second data message; the message forwarding processor is configured to transmit the second data message to a destination access router connected to a destination mobile terminal according to the location identification encapsulated in the second data message;

when the access router acts as the destination access router connected with the destination mobile terminal through a wireless link, in the destination access router, the mapping manager is configured to manage the mapping relationship between the identity identification and the location identification of the mobile terminal; the message encapsulation processor is configured to strip the location identification in the second data message and de-encapsulate the second data message into the first data message; the message forwarding processor is configured to transmit the first data message to the destination mobile terminal according to the identity identification in the first data message which is obtained by de-encapsulating the second data message;

wherein, the system for mobile communication control divides a network into an access network and a backbone network, the access router is connected with the access network and the backbone network, the identity identification is only used in the access network, the location identification is only used in the backbone network, and the identity identification is unique for each user in the access network and keeps unchanged during movement; and wherein the backbone network forms two logically independent functional planes: a mapping forwarding plane and a general forwarding plane, the mapping forwarding plane is configured to store identity identification-location identification mapping information of all mobile terminals in the whole network.

2. The system according to claim 1, wherein, the system further comprises a mapping forwarding server, which comprises the mapping manager configured to manage the location identification and the identity identification of the mobile terminal, where the location identification and the identity identification of the mobile terminal are related with each other; and the system further comprises an instructor configured to perform instruction cooperation with the access router, and query, maintain, update and delete the mapping relationship between the location identification and the identity identification of the mobile terminal.

3. The system according to claim 2, wherein,
the source access router further comprises a querier connected with the mapping manager and a message buffer connected with the message encapsulation processor; when the mapping manager of the source access router does not store the mapping relationship between the identity identification and the location identification of the destination mobile terminal:

the message buffer is configured to cache the first data message which is transmitted by the source mobile terminal firstly and whose destination address is the identity identification of the destination mobile terminal;

the querier is configured to query the mapping relationship between the identity identification and the location identification of the destination mobile terminal from the forwarding mapping server;

the mapping manager is configured to newly add the mapping relationship between the identity identification and the location identification of the destination mobile terminal according to a query result;

the message encapsulation processor is further configured to perform encapsulation processing on the first data message in the message buffer according to the newly added mapping relationship.

4. The system according to claim 2, wherein, the mapping forwarding server further comprises a message encapsulating and forwarding unit connected with the mapping manager, and the source access router further comprises the querier connected with the mapping manager, and when the mapping manager in the source access router does not store the mapping relationship between the identity identification and the location identification of the destination mobile terminal:

the message forwarding processor of the source access router is further configured to forward the first data message which is transmitted by the source mobile terminal firstly and whose destination address is the identity identification of the destination mobile terminal to the mapping forwarding server;

the message encapsulating and forwarding unit of the mapping forwarding server is configured to encapsulate the location identification according to the identity identification in the first data message to obtain the second data message, and route the second data message to the destination access router connected with the destination mobile terminal;

the querier of the source access router is configured to query the mapping relationship between the identity identification and the location identification of the destination mobile terminal from the mapping forwarding server; the mapping manager of the source access router is configured to newly add the mapping relationship between the identity identification and the location identification of the destination mobile terminal according to the query result.

5. The system according to claim 2, wherein, the access router further comprises a status notifier connected with the mapping manager, and the status notifier is configured to allocate the location identification to the mobile terminal when the mobile terminal moves to a predetermined area or the status of the mobile terminal changes; inform the mapping forwarding server of the allocated location identification of the mobile terminal; the instructor of the mapping forwarding server is configured to update the mapping relationship between the identity identification and the location identification of the mobile terminal according to the informed location identification.

6. The system according to claim 2, wherein, the access router further comprises an access manager connected with the status notifier and a mobility manager connected with the access manager and the message forwarding processor, and the access manager is configured to manage access information of the mobile terminal connected to the access router, and provide an access service of the mobile terminal; the mobility manager is configured to process a switching flow of the mobile terminal when the location of the mobile terminal changes, maintain a connecting relationship between the mobile terminal and the correspondent node, and initiates a routing optimization flow to the access router connected with the correspondent node when the mobile terminal switches to access.

7. The system according to claim 1, wherein, the access router further comprises an access manager connected with the status notifier and a mobility manager connected with the access manager and the message forwarding processor, and the access manager is configured to manage access information of the mobile terminal connected to the access router, and provide an access service of the mobile terminal; the mobility manager is configured to process a switching flow of the mobile terminal when the location of the mobile terminal changes, maintain a connecting relationship between the mobile terminal and the correspondent node, and initiates a routing optimization flow to the access router connected with the correspondent node when the mobile terminal switches to access.

8. The system according to claim 1, wherein, the system further comprises a common router, which is configured to route and forward the second data message.

9. The system according to claim 1, wherein, the identity identification and the location identification multiplex a coding space, and different mobile terminals multiplex the location identification.

10. A method for mobile communication control, and the method comprises a flow of sending a data message from a source mobile terminal to a destination mobile terminal, and the flow includes the following steps:

A, a source access router receiving a first data message sent by the source mobile terminal, and executing step B;

B, encapsulating a location identification according to an identity identification in the first data message to obtain a second data message; forwarding the second data message to a destination access router connected to the destination mobile terminal according to the location identification in the second data message; and C, the destination access router stripping the location identification encapsulation in the second data message to return the second data message to the first data message, and forwarding the first data message to the destination mobile terminal, wherein, the system for mobile communication control divides a network into an access network and a backbone network, the access router is connected with the access network and the backbone network, the identity identification is only used in the access network, the location identification is only used in the backbone network, and the identity identification is unique for each user in the access network and keeps unchanged during movement; and wherein, the backbone network forms two logically independent functional planes: a mapping forwarding plane and a general forwarding plane, the mapping forwarding plane is configured to store identity identification-location identification mapping information of all mobile terminals in the whole network.

11. The method according to claim 10, wherein, the flow of sending the data message from the source mobile terminal to the destination mobile terminal further comprises: in a mobile communication system, the source access router locally caching a mapping relationship between the identity identification and the location identification of the destination mobile terminal, a mapping forwarding server querying, maintaining, updating and deleting the mapping relationship between the location identification and the identity identification of the destination mobile terminal according to an instruction of the access router, and when the source access router receives the first data message which is firstly transmitted by the source mobile terminal and whose destination address is the identity identification of the destination mobile terminal, the source access router caching the first data message, and executing step B after obtaining the location identification of the destination mobile terminal by querying the mapping forwarding server according to the identity identification of the destination mobile terminal in the first data message.

12. The method according to claim 10, wherein, the flow of sending the data message from the source mobile terminal to the destination mobile terminal further comprises: in a mobile communication system, the source access router locally caching a mapping relationship between an identity identification and a location identification of the destination mobile terminal, a mapping forwarding server querying, maintaining, updating and deleting the mapping relationship between the location identification and the identity identification of the destination mobile terminal according to an instruction of the access router, and when the source access router receives the first data message which is firstly transmitted by the source mobile terminal and whose destination address is the identity identification of the destination mobile terminal, the source access router forwarding the first data message to the mapping forwarding server, and the mapping forwarding server executing step B.

13. The method according to claim 10, wherein, when the mobile terminal moves to the predetermined area, or the status of the mobile terminal changes, the method further comprises a status notification flow, which comprises:
the access router allocating the location identification to the mobile terminal;
the access router informing the mapping forwarding server of the allocated location identification of the mobile terminal; and
the mapping forwarding server updating the mapping relationship between the identity identification and the location identification of the mobile terminal according to the informed location identification.

14. The method according to claim 10, wherein, the method further comprises a routing optimization flow, which comprises:
when the mobile terminal switches to access, the access router allocating a new location identification to the mobile terminal and initiating a routing optimization flow to the access router of a correspondent node; and
the access router of the correspondent node updating the mapping relationship between the identity identification and the location identification of the mobile terminal in the routing optimization flow.

15. A mapping forwarding server applied in a mobile communication network, and the mapping forwarding server comprises:
one or more processors;
a mapping manager, which is implemented by the one or more processors and configured to manage a location identification and an identity identification of a mobile terminal;
an instructor, which is implemented by the one or more processors and configured to perform instruction cooperation with an access router, and query, maintain, update and delete a mapping relationship between the location identification and the identity identification of the mobile terminal;

a message encapsulating and forwarding unit, which is implemented by the one or more processors and configured to encapsulate the location identification according to the identity identification in a first data message to obtain a second data message, and route and forward the second data message to the access router which acts as a destination access router connected with a destination mobile terminal;
wherein, the mobile communication network is divided into an access network and a backbone network, the access router is connected with the access network and the backbone network, the identity identification is only used in the access network, the location identification is only used in the backbone network, and the identity identification is unique for each user in the access network and keeps unchanged during movement; and
wherein, the backbone network forms two logically independent functional planes: a mapping forwarding plane and a general forwarding plane, the mapping forwarding plane is configured to store identity identification-location identification mapping information of all mobile terminals in the whole network.

16. An access router, comprising:
one or more processors;
a mapping manager unit, which is implemented by the one or more processors and used to manage a mobile terminal connected to the access router and a mapping relationship between an identity identification and a location identification of a correspondent node;
a message encapsulation processor unit, which is implemented by the one or more processors and configured to add encapsulation of the location identification according to the identity identification in a first data message sent out by the mobile terminal and the mapping relationship in the mapping manager to obtain a second data message, and strip the location identification encapsulation in the second data message sent to the mobile terminal to obtain the first data message; and
a message forwarding processor unit, which is implemented by the one or more processors and configured to receive the first data message from the mobile terminal, receive the second data message from the access router connected with the correspondent node, and transmit the first data message to the mobile terminal and transmit the second data message to the access router connected with the correspondent node;
wherein, the access router is connected with an access network and a backbone network of a mobile communication network, the identity identification is only used in the access network, the location identification is only used in the backbone network, and the identity identification is unique for each user in the access network and keeps unchanged during movement; and
wherein, the backbone network forms two logically independent functional planes: a mapping forwarding plane and a general forwarding plane, the mapping forwarding plane is configured to store the identity identification-location identification mapping information of all mobile terminals in the whole network.

17. The access router according to claim 16, wherein, when the access router acts as a source access router, the source access router further comprises a querier connected with the mapping manager unit and a message buffer connected with the message encapsulation processor unit; when the mapping manager unit of the source access router does not store the mapping relationship of the destination mobile terminal:

the message buffer is configured to cache the first data message which is transmitted by the source mobile terminal firstly and whose destination address is the identity identification of the destination mobile terminal;

the querier is configured to implemented by the one or more processors and query the mapping relationship between the identity identification and the location identification of the destination mobile terminal from the forwarding mapping server;

the message encapsulation processor unit is further configured to perform encapsulation processing on the first data message in the message buffer according to a newly added mapping relationship.

18. The access router according to claim 16, wherein, when the access router acts as a source access router, the source access router further comprises a querier connected with the mapping manager unit, and when the mapping manager unit in the source access router does not store the mapping relationship between the identity identification and the location identification of the destination mobile terminal:

the message forwarding processor unit is further configured to forward the first data message which is transmitted by the source mobile terminal firstly and whose destination address is the identity identification of the destination mobile terminal to the mapping forwarding server;

the querier is implemented by the one or more processors and configured to query the mapping relationship between the identity identification and the location identification of the destination mobile terminal from the forwarding mapping server; the mapping manager is configured to newly add the mapping relationship between the identity identification and the location identification of the destination mobile terminal according to the query result.

19. The access router according to claim 16, wherein, the access router further comprises a status notifier connected with the mapping manager unit and implemented by the one or more processor, and the status notifier is configured to allocate the location identification to the mobile terminal when the mobile terminal moves to a predetermined area or the status of the mobile terminal changes, and inform the mapping forwarding server of the allocated location identification of the mobile terminal.

20. The access router according to claim 16, wherein, the access router further comprises an access manager and a mobility manager connected with the access manager, and the access manager is implemented by the one or more processors and configured to manage access information of the mobile terminal connected to the access router, and provide an access service of the mobile terminal; the mobility manager is implemented by the one or more processors and configured to process a switching flow of the mobile terminal when the location of the mobile terminal changes, maintain a connecting relationship between the mobile terminal and the correspondent node, and initiates a routing optimization flow to the access router connected with the correspondent node when the mobile terminal switches to access.

* * * * *